(12) United States Patent
Lim et al.

(10) Patent No.: US 11,735,733 B2
(45) Date of Patent: Aug. 22, 2023

(54) COMPOSITE NEGATIVE ELECTRODE FOR ALL-SOLID-STATE BATTERY

(71) Applicants: Hyundai Motor Company, Seoul (KR); Kia Motors Corporation, Seoul (KR)

(72) Inventors: Jae Min Lim, Suwon-si (KR); Yong Seok Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 312 days.

(21) Appl. No.: 16/917,018

(22) Filed: Jun. 30, 2020

(65) Prior Publication Data

US 2021/0013502 A1 Jan. 14, 2021

(30) Foreign Application Priority Data

Jul. 10, 2019 (KR) .................. 10-2019-0083086

(51) Int. Cl.
| | |
|---|---|
| *H01M 4/62* | (2006.01) |
| *H01M 4/46* | (2006.01) |
| *H01M 4/42* | (2006.01) |
| *H01M 4/38* | (2006.01) |
| *H01M 10/0525* | (2010.01) |
| *H01M 10/0562* | (2010.01) |
| *H01M 4/134* | (2010.01) |
| *H01M 4/02* | (2006.01) |
| *H01M 4/64* | (2006.01) |

(52) U.S. Cl.
CPC ............ *H01M 4/62* (2013.01); *H01M 4/134* (2013.01); *H01M 4/382* (2013.01); *H01M 4/387* (2013.01); *H01M 4/42* (2013.01); *H01M 4/463* (2013.01); *H01M 4/623* (2013.01); *H01M 4/625* (2013.01); *H01M 10/0525* (2013.01); *H01M 10/0562* (2013.01); *H01M 4/64* (2013.01); *H01M 2004/021* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 9,059,478 B2 * | 6/2015 | Yamazaki | ............. H01M 4/621 |
| 9,525,192 B2 | 12/2016 | Ose et al. | |
| 2016/0315353 A1 | 10/2016 | Matsushita et al. | |

FOREIGN PATENT DOCUMENTS

| | | |
|---|---|---|
| JP | 5455136 B2 | 3/2014 |
| JP | 5682318 B2 | 3/2015 |
| KR | 20160127652 A | 11/2016 |
| KR | 20180057135 A | 5/2018 |
| KR | 20180115130 A | 10/2018 |

* cited by examiner

*Primary Examiner* — Laura Weiner (74) *Attorney, Agent, or Firm* — Slater Matsil, LLP (57) ABSTRACT

A composite negative electrode for an all-solid-state battery is provided. The composite negative electrode includes a negative electrode current collector, and a negative electrode active material layer formed on the negative electrode current collector, wherein the negative electrode active material layer includes unit cells arranged with a gap therebetween, and wherein the unit cells include a solid electrolyte and a carbon material dispersed in the solid electrolyte.

19 Claims, 9 Drawing Sheets

COMPOSITE NEGATIVE ELECTRODE FOR ALL-SOLID-STATE BATTERY

CROSS-REFERENCE TO RELATED APPLICATIONS

The present application claims the benefit of Korean Patent Application No. 10-2019-0083086, filed on Jul. 10, 2019, which application is hereby incorporated herein by reference.

TECHNICAL FIELD

The present invention relates to a composite negative electrode for an all-solid-state battery.

BACKGROUND

Rechargeable secondary batteries are used not only for small-sized electronic devices such as mobile phones and laptop computers, but also for large-sized transport vehicles such as hybrid vehicles and electric vehicles. Accordingly, there is a need to develop secondary batteries having higher stability and energy density.

Conventional secondary batteries are mostly configured such that cells are formed using an organic solvent (organic liquid electrolyte), and thus limitations are imposed on the extent to which stability and energy density may be improved.

Meanwhile, an all-solid-state battery using an inorganic solid electrolyte is receiving a great deal of attention because a cell may be manufactured in a safer and simpler manner due to the exclusion of an organic solvent.

However, the all-solid-state battery is problematic in that the energy density and power output performance thereof do not reach those of conventional lithium ion batteries using a liquid electrolyte. With the goal of solving the above problem, thorough research into improving the electrodes of all-solid-state batteries is ongoing.

In particular, the negative electrode for an all-solid-state battery is mainly formed of graphite. In this case, ionic conductivity may be ensured when adding an excess of a solid electrolyte, having a high specific gravity, together with graphite, and thus the energy density per unit weight is very low compared to lithium ion batteries. Moreover, when lithium metal is used for the negative electrode, there are technical limitations in terms of price competitiveness and implementation over a large area.

SUMMARY

Accordingly, embodiments of the present invention have been made keeping in mind problems encountered in the related art, and specific features thereof are as follows.

The present invention relates to a composite negative electrode for an all-solid-state battery. Particular embodiments relate to a composite negative electrode for an all-solid-state battery, in which the negative electrode active material layer of the composite negative electrode is configured to include unit cells arranged with a predetermined gap therebetween, so that lithium, which is precipitated during charging of the all-solid-state battery, is stored in the gap.

An embodiment of the present invention provides a composite negative electrode for an all-solid-state battery, which may exhibit the inherent function of a rechargeable secondary battery and in which the volume and weight thereof are minimized, and an all-solid-state battery including the same.

Another embodiment of the present invention provides an all-solid-state battery, in which lithium is uniformly precipitated at the negative electrode during charging, thereby increasing durability.

Still another embodiment of the present invention provides an all-solid-state battery, in which dead lithium is not left behind at the negative electrode during discharging.

The embodiments of the present invention are not limited to the foregoing, and will be able to be clearly understood through the following description and to be realized by the means described in the claims and combinations thereof.

An embodiment of the present invention provides a composite negative electrode for an all-solid-state battery, including a negative electrode current collector and a negative electrode active material layer formed on the negative electrode current collector, in which the negative electrode active material layer includes unit cells arranged with a gap therebetween, and the unit cells include a solid electrolyte and a carbon material dispersed in the solid electrolyte.

The unit cells may be formed in a random array or in an m×n array, in which the m×n array is configured such that the number of unit cells arranged in a transverse direction is m and the number of unit cells arranged in a longitudinal direction is n, thus forming a total of m×n unit cells (wherein m and n are each independently a natural number equal to or greater than 1).

During charging of the all-solid-state battery, lithium may precipitate in the gap between the unit cells.

The unit cells may satisfy Equation 1 below.

$$5 \leq A/B \leq 2{,}000 \qquad \text{Equation 1}$$

Here, A is the length of one side of a quadrangle when the planar cross-sectional shape of the unit cells is the quadrangle, and B is the height of the unit cells.

The unit cells may satisfy Equation 2 below.

$$0.05 \leq A/C \leq 40 \qquad \text{Equation 2}$$

Here, A is the length of one side of a quadrangle when the planar cross-sectional shape of the unit cells is the quadrangle, and C is the gap between the unit cells.

The planar cross-sectional shape of the unit cells may be a quadrangle, and the length A of one side of the quadrangle may be 500 μm to 20,000 μm.

The height B of the unit cells may be 10 μm to 100 μm.

The length C of the gap between the unit cells may be 500 μm to 10,000 μm.

The solid electrolyte may include a sulfide-based solid electrolyte.

All or part of the solid electrolyte may be electrically connected by the carbon material.

The carbon material may be selected from the group consisting of carbon nanotubes (CNTs), carbon nanofiber (CNF), vapor-grown carbon fiber (VGCF) and combinations thereof.

The carbon material may have an average length of 1 μm to 300 μm and an average diameter of 1 nm to 100 nm.

The mass ratio of the carbon material and the solid electrolyte contained in the unit cells may be 2:8 to 8:2.

The unit cells may further include metal particles dispersed in the solid electrolyte.

The metal particles may be selected from the group consisting of lithium (Li), indium (In), gold (Au), bismuth (Bi), zinc (Zn), aluminum (Al), iron (Fe), tin (Sn), titanium (Ti) and combinations thereof.

The metal particles may have a particle size ($D_{50}$) of 0.1 µm to 150 µm.

The metal particles may have at least one shape selected from group consisting of a spherical shape, an ellipsoidal shape, a polyhedral shape and combinations thereof.

The mass ratio of the metal particles and the solid electrolyte contained in the unit cells may be 0.05:9.95 to 2:8.

The unit cells may have a porosity of 0.1 to 70%.

Another embodiment of the present invention provides an all-solid-state battery, including the above composite negative electrode, a positive electrode and a solid electrolyte layer disposed between the composite negative electrode and the positive electrode.

According to embodiments of the present invention, the negative electrode active material layer of a composite negative electrode for an all-solid-state battery can be configured to include unit cells arranged with a gap therebetween, so that lithium, which is precipitated during charging of the all-solid-state battery, is uniformly stored in the gap, thus preventing dendrites from growing.

According to embodiments of the present invention, dead lithium is not left behind at the composite negative electrode for an all-solid-state battery, thereby further increasing the durability of the all-solid-state battery.

According to embodiments of the present invention, the unit cells that constitute the negative electrode active material layer of the composite negative electrode for an all-solid-state battery include a carbon material and a solid electrolyte, and the unit cells have porosity of a predetermined level, whereby the same negative electrode function can be realized even in the absence of the negative electrode active material, thereby minimizing the volume and weight of the negative electrode.

According to embodiments of the present invention, since the composite negative electrode contains no graphite, there is no negative electrode volume expansion during charging and discharging, thereby greatly increasing the lifetime of the all-solid-state battery.

According to embodiments of the present invention, the energy density per unit weight of the all-solid-state battery and the energy density per unit volume thereof can be significantly increased.

The effects of embodiments of the present invention are not limited to the foregoing, and should be understood to include all effects that can be reasonably anticipated from the following description.

DETAILED DESCRIPTION OF ILLUSTRATIVE EMBODIMENTS

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of embodiments of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Figure 1:
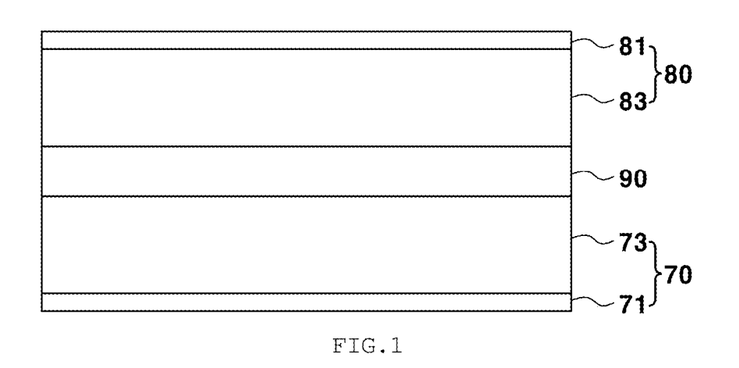
FIG. 1 is a cross-sectional view schematically showing a conventional all-solid-state battery.

FIG. 1 is a cross-sectional view schematically showing a conventional all-solid-state battery. With reference thereto, the all-solid-state battery includes a negative electrode 70, a positive electrode 80, and a solid electrolyte layer 90 interposed between the negative electrode 70 and the positive electrode 80. The negative electrode 70 includes a negative electrode current collector 71 and a negative electrode active material layer 73, and the positive electrode 80 includes a positive electrode current collector 81 and a positive electrode active material layer 83.

The negative electrode active material layer 73 of the conventional all-solid-state battery includes graphite as a negative electrode active material. Also, in order to ensure ionic conductivity in the negative electrode active material layer 73, an excess of solid electrolyte is added therewith. Accordingly, the volume and weight of the negative electrode 70 are increased, thus decreasing energy density, which is undesirable.

Moreover, in the case of graphite, which is the negative electrode active material, due to the large volume expansion and contraction caused by charging and discharging of the battery, a short circuit occurs in the negative electrode active material layer 73, resulting in large resistance, which shortens the lifetime of the battery.

Lithium metal may also be used for the negative electrode 70 of the all-solid-state battery, but lithium metal is expensive and has a low reaction rate. Furthermore, dendrite growth thereof causes short circuits and makes it difficult to realize a large area.

Embodiments of the present invention have been made keeping in mind problems encountered in the related art, and the composite negative electrode for an all-solid-state battery according to embodiments of the present invention is described in detail below.

Figure 2:
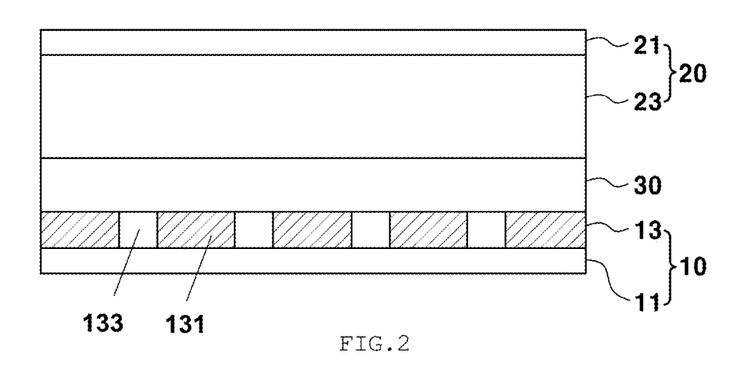
FIG. 2 is a cross-sectional view schematically showing an all-solid-state battery according to embodiments of the present invention.

FIG. 2 is a cross-sectional view schematically showing an all-solid-state battery according to embodiments of the present invention. With reference thereto, the all-solid-state battery includes a composite negative electrode 10, a positive electrode 20, and a solid electrolyte layer 30 disposed between the composite negative electrode 10 and the positive electrode 20. The composite negative electrode 10 includes a negative electrode current collector 11 and a negative electrode active material layer 13 formed on the negative electrode current collector 11. The negative electrode active material layer 13 includes unit cells 131 arranged with a gap 133 therebetween that may include lithium as described herein. Positive electrode 20 includes a positive electrode current collector 21 and a positive electrode active material layer 23.

Composite Negative Electrode

Figure 3:
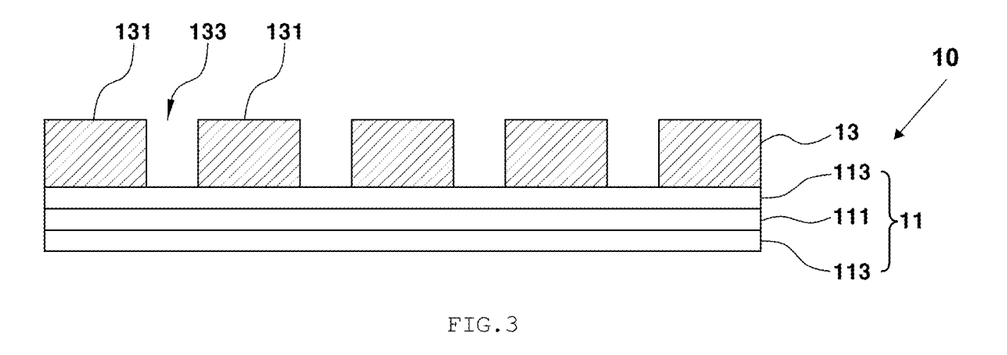
FIG. 3 is a cross-sectional view schematically showing a composite negative electrode for an all-solid-state battery according to embodiments of the present invention.

FIG. 3 is a cross-sectional view schematically showing the composite negative electrode 10. With reference thereto, the composite negative electrode 10 includes a negative electrode current collector 11 and a negative electrode active material layer 13 formed on the negative electrode current collector 11.

The negative electrode current collector 11 may include a metal substrate in including any one selected from the group consisting of nickel (Ni), copper (Cu) and combinations thereof. Examples thereof may include nickel mesh, copper foil, etc.

The negative electrode current collector 11 may be in a sheet form, and a coating layer 113 may be formed on one or both surfaces thereof.

The coating layer 113 may include any one selected from the group consisting of soft carbon, hard carbon, carbon nanotubes (CNTs), carbon nanofiber (CNF), vapor-grown carbon fiber (VGCF) and combinations thereof.

The coating layer 113 may have a thickness of about 1 μm to 15 μm. The thickness of the coating layer 113 may be measured through observation using, for example, a transmission electron microscope (TEM).

When the coating layer 113 is formed to the above thickness using the above material on the metal substrate 111 in this way, the potential of the all-solid-state battery may be maintained.

The negative electrode active material layer 13 includes unit cells 131 arranged with a gap 133 therebetween.

The unit cells 131 may be formed in a random array or an m×n array.

The random array means a structure configured such that the unit cells 131 are irregularly randomly arranged on the negative electrode current collector 11.

Figure 4:
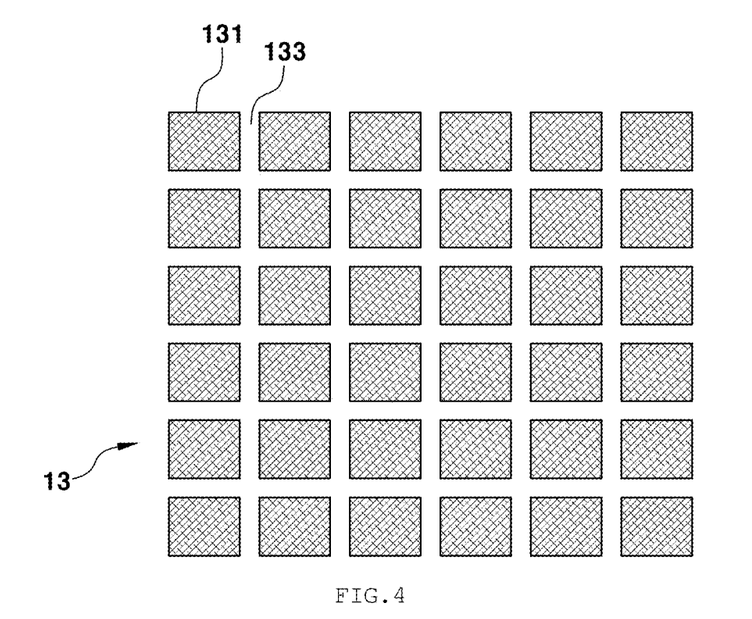
FIG. 4 is a top plan view showing a negative electrode active material layer configured such that unit cells are arranged with a gap therebetween.
Figure 5:
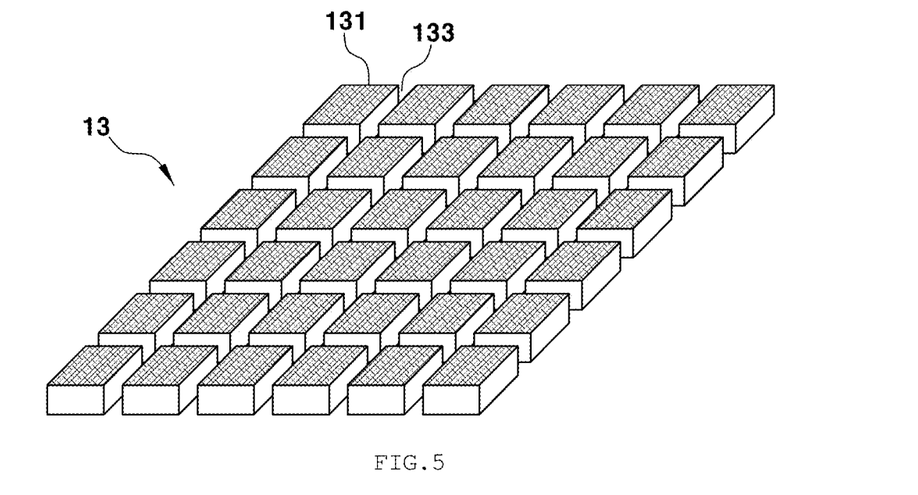
FIG. 5 is a perspective view showing the negative electrode active material layer configured such that unit cells are arranged with a gap therebetween.

The m×n array means a structure configured such that the number of unit cells 131 arranged in a transverse direction is m and the number of unit cells 131 arranged in a longitudinal direction is n, thus forming a total of m×n unit cells. Here, m and n may independently be natural numbers of 1 or more. FIGS. 4 and 5 are, respectively, a top plan view and a perspective view of the negative electrode active material layer 13 in which the unit cells 131 are arranged in the m×n array with a gap 133 therebetween.

Here, the random array or the m×n array is a specific example of the unit cells 131, and the array structure of the unit cells 131 is not limited thereto.

In embodiments of the present invention, the negative electrode active material layer 13 includes the unit cells 131 in which any one unit cell 131 and another unit cell 131 adjacent thereto are spaced apart from each other with a gap therebetween.

FIGS. 6A to 6D are reference views showing technical characteristics of embodiments of the present invention, in which the state of the negative electrode active material layer 13 depending on charging or discharging of the all-solid-state battery is schematically depicted.

Figure 6A:
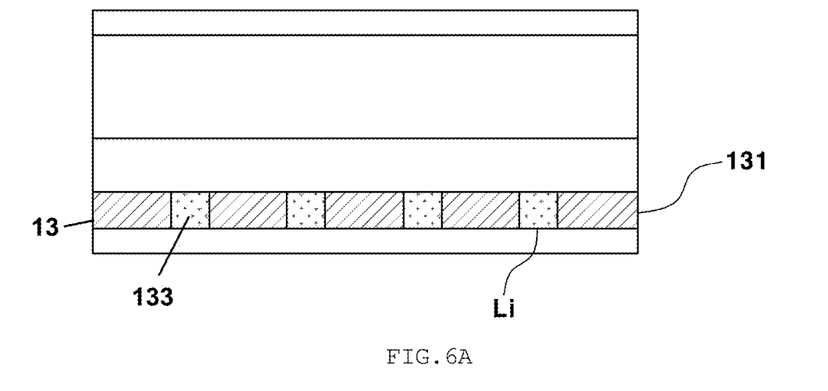
FIG. 6A shows an all-solid-state battery according to embodiments of the present invention, charging of which is completed.

FIG. 6A shows an all-solid-state battery, charging of which is completed. With reference thereto, lithium (Li) is precipitated and stored in the gap 133 between the unit cells 131. As will be described later, the unit cells 131 are porous, and thus lithium (Li) generated during charging is preferentially stored in the gap 133, and may also be stored in the pores 131d in the unit cells 131 (see FIG. 8). In this way, the all-solid-state battery according to embodiments of the present invention is configured such that lithium (Li) precipitated during charging is uniformly stored, thus effectively suppressing the growth of dendrites. For reference, in order to uniformly precipitate lithium (Li) during charging, it is preferred that the unit cells be arranged with a predetermined gap therebetween in the m×n array shown in FIGS. 4 and 5.

Figure 6B:
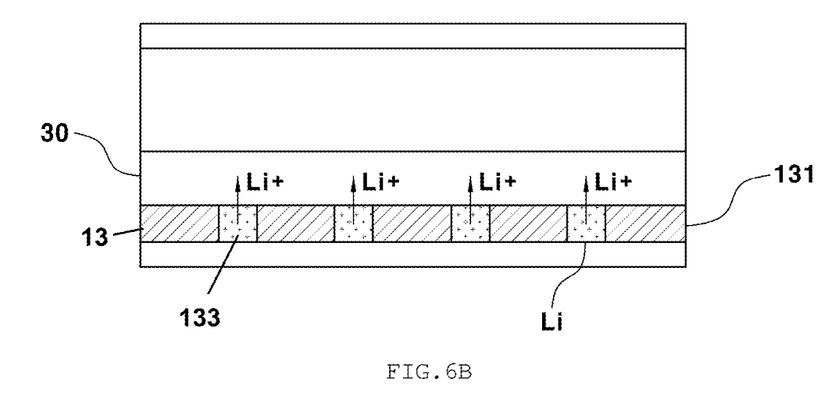
FIG. 6B shows an all-solid-state battery according to embodiments of the present invention when discharging starts.

FIG. 6B shows an all-solid-state battery when discharging starts. With reference thereto, the upper surface of the lithium (Li) stored in the gap 133 between unit cells 131 comes into contact with the solid electrolyte layer 30, and thus lithium ions (Li+) may directly move through the solid electrolyte layer 30 during charging.

Figure 6C:
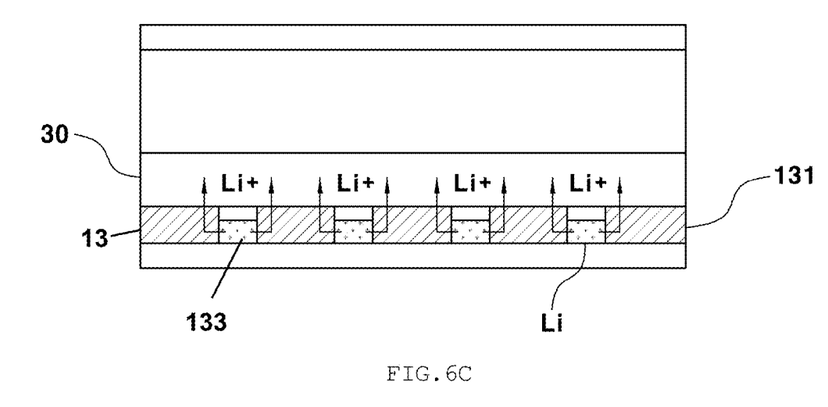
FIG. 6C shows an all-solid-state battery according to embodiments of the present invention when discharging proceeds to a certain extent.

FIG. 6C shows an all-solid-state battery when discharging proceeds to a certain extent. With reference thereto, lithium (Li) stored in the gap 133 does not come into contact with the solid electrolyte layer 30. In this case, lithium ions (Li+) may move to the solid electrolyte layer 30 through the solid electrolyte 131a of the unit cells 131 (see FIG. 8).

Figure 6D:
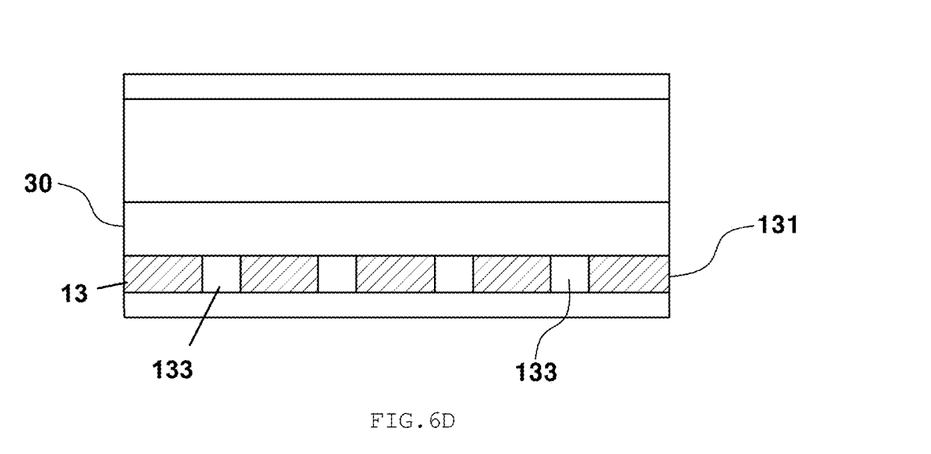
FIG. 6D shows an all-solid-state battery according to embodiments of the present invention, discharging of which is completed.

FIG. 6D shows an all-solid-state battery, discharging of which is completed. As shown in FIGS. 6B and 6C, lithium (Li) stored in the gap 133 between unit cells 131 below solid electrolyte layer 30 during charging is converted into lithium ions (Li+), and may thus directly or indirectly move to the solid electrolyte layer 30, whereby dead lithium is not left behind in the composite negative electrode 10 according to embodiments of the present invention.

Consequently, according to embodiments of the present invention, dendrites do not form at the composite negative electrode 10 during charging, and dead lithium does not remain behind during discharging, thereby obtaining an all-solid-state battery having greatly increased durability and a longer lifetime.

Figure 7:
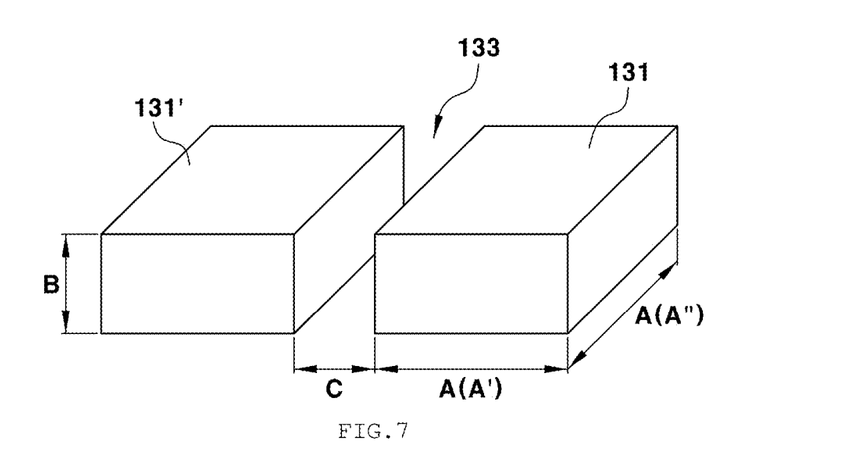
FIG. 7 is a reference view showing the unit cells and the gap therebetween according to embodiments of the present invention.

FIG. 7 is a reference view showing the unit cells 131 and the gap 133 therebetween according to the present invention.

The unit cells 131 may be formed so as to satisfy Equation 1 below.

$$5 \leq A/B \leq 2{,}000 \qquad \text{Equation 1}$$

Here, A is the length of one side of a quadrangle when the planar cross-sectional shape of the unit cells 131 is the quadrangle, and B is the height of the unit cells 131.

The planar cross-sectional shape of the unit cells 131 may be a square or a rectangle. When the planar cross-sectional shape thereof is a rectangle, A may be interpreted as meaning either any one side (A') or one of its adjacent sides (A'') of the planar cross-section.

The unit cells 131 may be arranged so as to satisfy Equation 2 below.

$$0.05 \leq A/C \leq 40 \qquad \text{Equation 2}$$

Here, A is the length of one side of a quadrangle when the planar cross-sectional shape of the unit cells 131 is the quadrangle, and C is the length of the gap 133 between the unit cells 131.

When the planar cross-sectional shape of the unit cells 131 is a rectangle, A may be interpreted as meaning either any one side (A') or one of its adjacent sides (A'') of the planar cross-section.

When A, B and C for the unit cells 131 and the gap 133 therebetween satisfy the above Equations 1 and 2, the technical characteristics of embodiments of the present invention described above may be exhibited.

Specifically, the length A of one side of the planar cross-section of the unit cells 131 may be 500 μm to 20,000 μm, and the height B of the unit cells 131 may be 10 μm to 100 μm. Furthermore, the length C of the gap 133 between the unit cells 131 may be 500 μm to 10,000 μm. However, the specific numeric values of A, B and C are not limited to the above ranges, and may be appropriately adjusted depending on the specifications of the all-solid-state battery within a range satisfying the above Equations 1 and 2.

Figure 8:
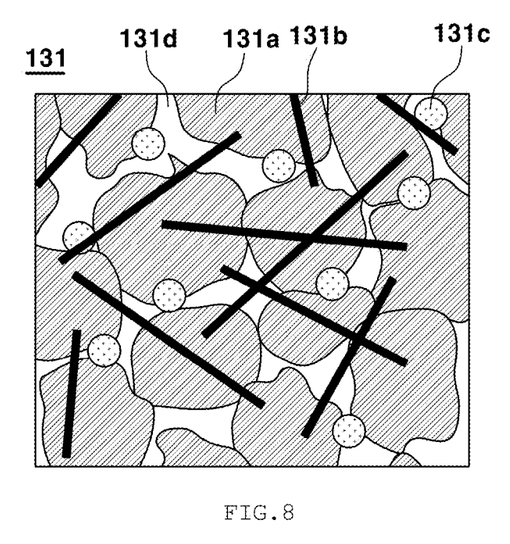
FIG. 8 is an enlarged view showing part of the unit cell according to embodiments of the present invention.

FIG. 8 is an enlarged view showing part of the unit cell 131. With reference thereto, the unit cell 131 may include a solid electrolyte 131a, a carbon material 131b and metal particles 131c dispersed in the solid electrolyte 131a.

In the unit cells 131, the carbon material 131b may be intertwined to form a three-dimensional network structure, and the solid electrolyte 131a may be loaded in a portion of the network structure in a thickness direction. When the solid electrolyte 131a is fully loaded in the network structure in a thickness direction, the pores 131d are not formed. Hence, it is preferable to fill only a portion of the network structure.

The unit cells 131 do not include a negative electrode active material, such as graphite, a silicon-based compound, etc.

The solid electrolyte 131a in a powder phase is mixed with the carbon material 131b and the metal particles 131c to form unit cells 131. The pores 131d, which are void, are formed between the particles of the solid electrolyte 131a. Thus, the unit cells 131 may be porous. Specifically, the porosity of the unit cells 131 may be 0.1% to 70%. As used herein, the porosity is the proportion of the pores 131d contained in the unit volume of the unit cells 131. Although not limited thereto, the porosity may be measured as follows.

Specifically, the true density of the unit cells 131 is measured using a gas-phase substitution method (Pycnometer method) or a liquid-phase method (Archimedes method), and the thin film density is calculated using the following equation.

Thin film density=weight of thin film/(film thickness of thin film×area of thin film)

The porosity is calculated using the true density and the thin film density.

Porosity=(true density−thin film density)/true density×100

The solid electrolyte 131a is responsible for conducting lithium ions in the negative electrode active material layer 13, and may be an oxide-based solid electrolyte or a sulfide-based solid electrolyte. However, it is preferable to use a sulfide-based solid electrolyte having high lithium ion conductivity.

The sulfide-based solid electrolyte may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers, and Z is any one of Ge, Zn and Ga), $Li_2S$—$GeS_2$, $Li_2S$—$SiS_2$—$Li_3PO_4$, $Li_2S$—$SiS_2$—$Li_xMO_y$ (in which x and y are positive numbers, and M is any one of P, Si, Ge, B, Al, Ga and In), $Li_{10}GeP_2S_{12}$, etc.

The sulfide-based solid electrolyte may have a particle size ($D_{50}$) of 0.1 to 10 μm.

The sulfide-based solid electrolyte preferably has a lithium ion conductivity of $1\times10^{-4}$ S/cm or more.

All or part of the solid electrolyte 131a may be electrically connected by the carbon material 131b.

The carbon material 131b may be selected from the group consisting of carbon nanotubes (CNTs), carbon nanofiber (CNF), vapor-growth carbon fiber (VGCF) and combinations thereof. For example, carbon nanotubes (CNTs) may be used. The carbon nanotubes (CNTs) may be single-wall carbon nanotubes (SWCNTs), multi-wall carbon nanotubes (MWCNTs), etc.

The carbon material 131b has a large number of sites that may bind to lithium ions, and is thus capable of storing lithium ions that have moved to the composite negative electrode 10 through charging of the battery, similarly to graphite, and also of maintaining the potential of the battery.

The carbon material 131b may have an average length of 1 µm to 300 µm, an average diameter of 1 nm to 100 nm, and an aspect ratio (average length/average diameter) of 10,000 or more. The average length and the average diameter of the carbon material 131b may be measured using a commercially available measuring device, or may be obtained by measuring the lengths and diameters of a predetermined number of pieces of carbon material 131b arbitrarily extracted from an electron micrograph and then determining the average values thereof.

The metal particles 131c may function as a kind of seed for lithium ions moving to the composite negative electrode 10 during charging of the all-solid-state battery. As described above, lithium (Li) generated during charging of the all-solid-state battery is preferentially stored in the gap 133 between the unit cells 131, but may also be stored in the unit cells 131 that are porous. Here, in the unit cells 131, lithium ions mainly grow to lithium (Li) around the metal particles 131c. Since the metal particles 131c are uniformly dispersed in the unit cells 131, lithium is evenly stored in the composite negative electrode 10.

The metal particles 131c may include a metal-based element that may be alloyed with lithium. Specifically, the metal particles may be selected from the group consisting of lithium (Li), indium (In), gold (Au), bismuth (Bi), zinc (Zn), aluminum (Al), iron (Fe), tin (Sn), titanium (Ti) and combinations thereof.

The metal particles 131c may have a particle size ($D_{50}$) of 0.1 µm to 150 µm. When the particle size ($D_{50}$) of the metal particles 131c falls in the above range, the metal particles may be uniformly dispersed in the unit cells 131 and may function as a seed for lithium ions.

The shape of the metal particles 131c is not particularly limited, and may have, for example, at least one selected from the group consisting of a spherical shape, an ellipsoidal shape, a polyhedral shape and combinations thereof.

The negative electrode active material layer 13 may include the carbon material 131b and the solid electrolyte 131a at a mass ratio of 2:8 to 8:2. If the amount of the carbon material 131b exceeds the above range, the relative amount of the solid electrolyte 131a is decreased and the lithium ion conductivity in the composite negative electrode 10 may decrease.

The unit cells 131 may further include a binder (not shown). The binder may be BR (butadiene rubber), NBR (nitrile butadiene rubber), HNBR (hydrogenated nitrile butadiene rubber), PVDF (polyvinylidene difluoride), PTFE (polytetrafluoroethylene), CMC (carboxymethylcellulose), etc.

The unit cells 131 may include 0.1 parts by weight to 25 parts by weight of the binder based on 100 parts by weight, which is the sum of the carbon material 131b and the solid electrolyte 131a. If the amount of the binder exceeds 25 parts by weight, the amounts of carbon material 131b and solid electrolyte 131a are excessively small, and thus the composite negative electrode 10 cannot function properly, and the binder acts as a resistor in the composite negative electrode 10, undesirably deteriorating battery performance.

The unit cells 131 may include the metal particles 131c and the solid electrolyte 131a at a mass ratio of 0.05:9.95 to 2:8. If the amount of the metal particles 131c exceeds the above range, the amount of the metal particles 131c is excessively large, undesirably deteriorating dispersibility.

As described above, the unit cells 131 include the pores 131d. When the unit cells 131 are formed so as to have a porosity in a specific range in the state in which the carbon material 131b and the metal particles 131c are evenly distributed in the powder in which the particles of the solid electrolyte 131a agglomerate, a space for storing lithium ions may be ensured in the unit cells 131.

Positive Electrode

The positive electrode 20 includes a positive electrode current collector 21 and a positive electrode active material layer 23.

The positive electrode current collector 21 may be aluminum foil, etc.

The positive electrode active material layer 23 may include a positive electrode active material, a solid electrolyte, a conductive material, a binder, etc.

The positive electrode active material may be an oxide active material or a sulfide active material.

The oxide active material may be a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$ and the like, a spinel-type active material such as $LiMn_2O_4$, $Li(Ni_{0.5}Mn_{1.5})O_4$ and the like, an inverse-spinel-type active material such as $LiNiVO_4$, $LiCoVO_4$ and the like, an olivine-type active material such as $LiFePO_4$, $LiMnPO_4$, $LiCoPO_4$, $LiNiPO_4$ and the like, a silicon-containing active material such as $Li_2FeSiO_4$, $Li_2MnSiO_4$ and the like, a rock-salt-layer-type active material in which a portion of a transition metal is substituted with a different metal, such as $LiNi_{0.8}Co_{(0.2-x)}Al_xO_2$ ($0<x<0.2$), a spinel-type active material in which a portion of a transition metal is substituted with a different metal, such as $Li_{1+x}Mn_{2-x-y}M_yO_4$ (M being at least one of Al, Mg, Co, Fe, Ni and Zn, $0<x+y<2$), or lithium titanate such as $Li_4Ti_5O_{12}$ and the like.

The sulfide active material may be copper chevrel, iron sulfide, cobalt sulfide, nickel sulfide, etc.

The solid electrolyte may be an oxide solid electrolyte or a sulfide solid electrolyte, and may be the same as or different from the solid electrolyte contained in the unit cells 131.

The conductive material may be carbon black, conductive graphite, ethylene black, graphene, etc.

The binder may be BR (butadiene rubber), NBR (nitrile butadiene rubber), HNBR (hydrogenated nitrile butadiene rubber), PVDF (polyvinylidene difluoride), PTFE (polytetrafluoroethylene), CMC (carboxymethylcellulose), etc., and may be the same as or different from the binder contained in the unit cells 131.

Solid Electrolyte Layer

The solid electrolyte layer 30 may be interposed between the composite negative electrode 10 and the positive electrode 20 such that lithium ions move between the two electrodes.

The solid electrolyte layer 30 may include an oxide-based solid electrolyte or a sulfide-based solid electrolyte. Here, the solid electrolyte may be the same as or different from the solid electrolyte contained in the unit cells 131.

A better understanding of embodiments of the present invention will be given through the following examples. These examples are merely set forth to illustrate embodiments of the present invention, but are not to be construed as limiting the scope of the present invention.

EXAMPLE

Slurry, including a carbon material, a solid electrolyte, metal particles, a binder and a solvent, was prepared. As the carbon material, carbon nanotubes (CNTs) having an average length of about 100 μm and an average diameter of about 10 nm were used, and as the solid electrolyte, a sulfide-based solid electrolyte having an argyrodite-type crystal structure and represented by $Li_6PS_5Cl$ was used. The metal particles were spherical lithium particles and the binder was BR (butadiene rubber).

The mass ratio of the carbon material to the solid electrolyte was 2:8. The binder was used in an amount of about 5 parts by weight based on 100 parts by weight, which is the sum of the carbon material and the solid electrolyte. The weight ratio of the metal particles to the solid electrolyte was 1:9.

Unit cells in the pattern shown in FIGS. 4 and 5 were formed on a negative electrode current collector using the slurry. Specifically, the unit cells had a square planar cross-sectional shape, the length A of one side of which was 3,000 μm and the height B of which was 30 μm. The gap between the unit cells was 3,000 μm. Here, A/B of Equation 1 is 100 and A/C of Equation 2 is 1.

As the negative electrode current collector, a piece of copper foil, configured such that a coating layer was formed to a thickness of about 2 μm on each of both surfaces thereof, was used.

The unit cells were roll-pressed, and thus the porosity thereof was controlled to about 30%, thereby completing a negative electrode active material layer and a composite negative electrode including the same.

Comparative Example 1

A composite negative electrode was manufactured in the same manner using the same composition as in the Example above, with the exception that the slurry of the Example was applied on the negative electrode current collector to form a layer having a thickness of 30 μm, followed by roll pressing.

Comparative Example 2

A composite negative electrode was manufactured in the same manner using the same composition as in Comparative Example 1, with the exception that a slurry was prepared without the addition of lithium particles as the metal particles.

Test Example 1

An all-solid-state battery was formed by stacking the composite negative electrode of each of the Example and Comparative Example 1, a solid electrolyte layer and a positive electrode, after which the all-solid-state battery was charged and discharged. The discharged all-solid-state battery was disassembled, and the state of the composite negative electrode was observed with the naked eye and analyzed with an SEM (scanning electron microscope).

Figure 9A:
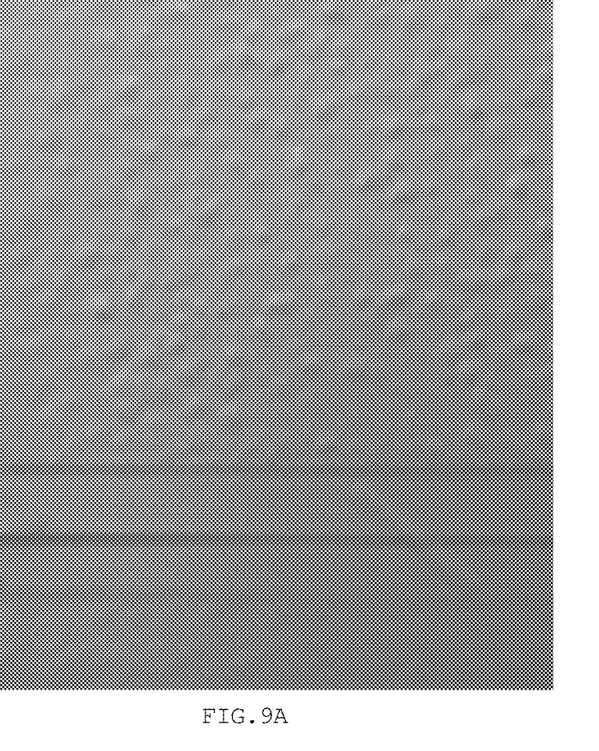
FIG. 9A shows the composite negative electrode of Comparative Example 1 observed with the naked eye in Test Example 1.
Figure 9B:
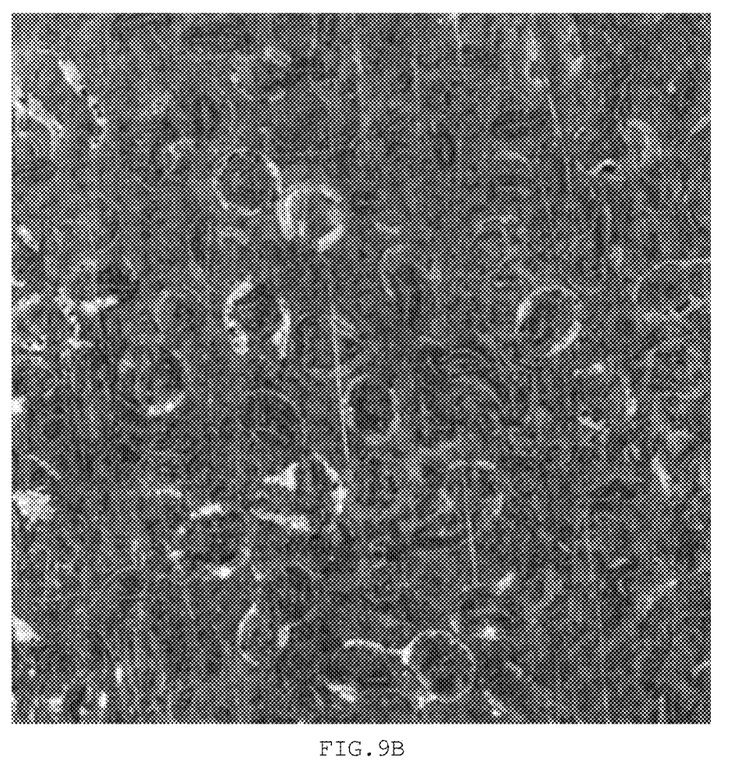
FIG. 9B shows the composite negative electrode of Comparative Example 1 analyzed with a scanning electron microscope (SEM) in Test Example 1.

The results of Comparative Example 1 are shown in FIGS. 9A and 9B. Specifically, FIG. 9A shows the result of observation with the naked eye, and FIG. 9B shows the SEM image. With reference thereto, in Comparative Example 1, in which the negative electrode active material layer of the composite negative electrode was formed into a layer having a predetermined thickness, lithium dendrites and dead lithium were left behind in large amounts after discharging.

Figure 10A:
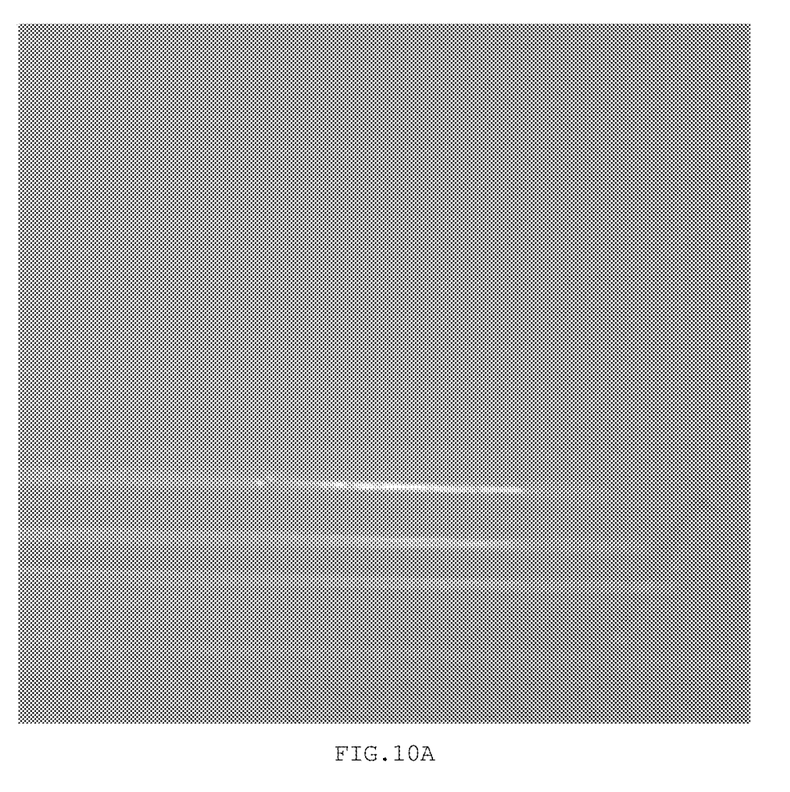
FIG. 10A shows the composite negative electrode of the Example observed with the naked eye in Test Example 1.
Figure 10B:
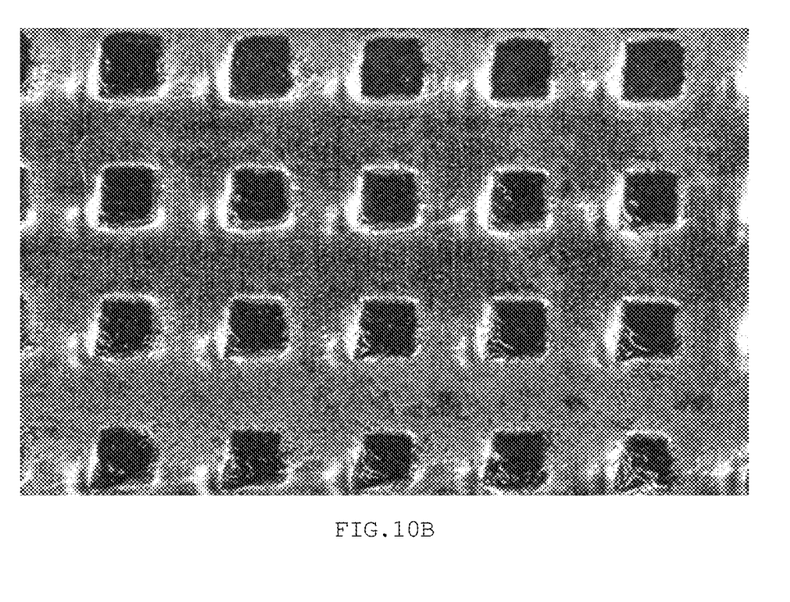
FIG. 10B shows the composite negative electrode of the Example analyzed with an SEM in Test Example 1.

The results of the Example are shown in FIGS. 10A and 10B. Specifically, FIG. 10A shows the result of observation with the naked eye and FIG. 10B shows the SEM image. With reference thereto, in the Example, in which the negative electrode active material layer of the composite negative electrode was configured to include unit cells arranged with a gap therebetween, lithium dendrites and dead lithium were not present after discharging.

Test Example 2

Figure 11:
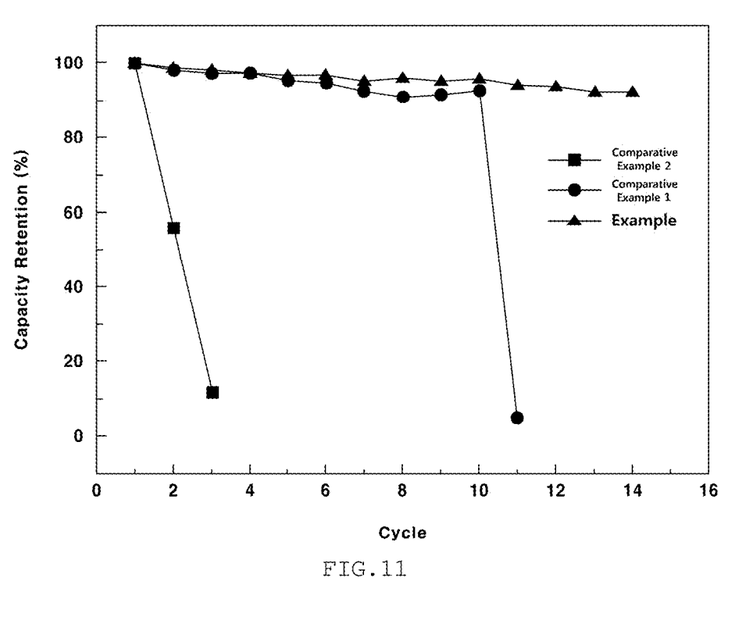
FIG. 11 shows the results of measurement of capacity retention of the all-solid-state batteries of the Example and Comparative Examples 1 and 2 during repeated charge/discharge cycles.

Each all-solid-state battery of Test Example 1 was repeatedly charged and discharged, and the capacity retention thereof was measured. The results are shown in FIG. 11.

With reference thereto, a capacity of 90% or more was maintained in the Example even after 14 charge/discharge cycles, but the operation of the all-solid-state battery was stopped in Comparative Example 1 after 10 charge/discharge cycles.

Although specific embodiments of the present invention have been described with reference to the accompanying drawings, those skilled in the art will appreciate that the present invention may be embodied in other specific forms without changing the technical spirit or essential features thereof. Thus, the embodiments described above should be understood to be non-limiting and illustrative in every way.

What is claimed is:

1. A composite negative electrode for an all-solid-state battery comprising a cathode having a lithium oxide, the composite negative electrode comprising:
   a negative electrode current collector; and
   unit cells formed on the negative electrode current collector;
   wherein one unit cell and another unit cell adjacent thereto are spaced apart from each other with a gap therebetween; and
   wherein the unit cells include an active material comprising a carbon material and a solid electrolyte, the carbon material is intertwined to form a three-dimensional network structure, the solid electrolyte is loaded in a portion of the network structure, and lithium is configured to be precipitated in the gap between the unit cells during charging.

2. The composite negative electrode of claim 1, wherein the unit cells are formed in a random array or in an m×n array, and wherein the m×n array is configured such that a number of unit cells arranged in a transverse direction is m and a number of unit cells arranged in a longitudinal direction is n, thus forming a total of m×n unit cells (wherein m and n are each independently a natural number of 1 to 6).

3. The composite negative electrode of claim 1, wherein the unit cells satisfy an equation $5 \leq A/B \leq 2,000$, wherein A is a length of one side of a quadrangle when a planar cross-sectional shape of the unit cells is the quadrangle, and B is a height of the unit cells, wherein the length of one side of the quadrangle is 500 μm to 20,000 μm, and the height of the unit cells is 10 μm to 100 μm.

4. The composite negative electrode of claim 1, wherein the unit cells satisfy an equation $0.05 \leq A/C \leq 40$, wherein A is a length of one side of a quadrangle when a planar cross-sectional shape of the unit cells is the quadrangle, and C is the gap between the unit cells, wherein the length of one side of the quadrangle is 500 μm to 20,000 μm, and the length of the gap between the unit cells is 500 μm to 10,000 μm.

5. The composite negative electrode of claim 1, wherein the solid electrolyte includes a sulfide-based solid electrolyte.

6. The composite negative electrode of claim 1, wherein the unit cells include particles of the solid electrolyte, and the particles of the solid electrolyte are electrically connected to each other by the carbon material.

7. The composite negative electrode of claim 1, wherein the carbon material is selected from the group consisting of carbon nanotubes (CNTs), carbon nanofiber (CNF), vapor-grown carbon fiber (VGCF) and combinations thereof.

8. The composite negative electrode of claim 1, wherein the carbon material has an average length of 1 μm to 300 μm and an average diameter of 1 nm to 100 nm.

9. The composite negative electrode of claim 1, wherein a mass ratio of the carbon material and the solid electrolyte contained in the unit cells is 2:8 to 8:2.

10. The composite negative electrode of claim 1, wherein the unit cells further include a plurality of metal particles mixed with the solid electrolyte.

11. The composite negative electrode of claim 10, wherein the metal particles comprise particles selected from the group consisting of lithium (Li), indium (In), gold (Au), bismuth (Bi), zinc (Zn), aluminum (Al), iron (Fe), tin (Sn), titanium (Ti) and combinations thereof.

12. The composite negative electrode of claim 10, wherein the metal particles have a particle size of 0.1 μm to 150 μm.

13. The composite negative electrode of claim 10, wherein each metal particle of the plurality of metal particles has a spherical shape, an ellipsoidal shape, or a polyhedral shape, independent of the shape of each other metal particle of the plurality of metal particles.

14. The composite negative electrode of claim 10, wherein a mass ratio of the metal particles and the solid electrolyte contained in the unit cells is 0.05:9.95 to 2:8.

15. The composite negative electrode of claim 1, wherein the unit cells have a porosity of 0.1 to 70%.

16. An all-solid state battery comprising:
a composite negative electrode comprising:
a negative electrode current collector, and
unit cells formed on the negative electrode current collector, wherein one unit cell and another unit cell adjacent thereto are spaced apart from each other with a gap therebetween, and the unit cells include an active material comprising a carbon material and a solid electrolyte, the carbon material is intertwined to form a three-dimensional network structure, the solid electrolyte is loaded in a portion of the network structure, and lithium is configured to be precipitated in the gap between the unit cells during charging;
a positive electrode comprising a lithium oxide; and
a solid electrode layer comprising an oxide-based solid electrolyte or a sulfide-based solid electrolyte disposed between the composite negative electrode and the positive electrode.

17. The battery of claim 16, wherein the unit cells are formed in a random array or in an m×n array, and wherein the m×n array is configured such that a number of unit cells arranged in a transverse direction is m and a number of unit cells arranged in a longitudinal direction is n, thus forming a total of m×n unit cells (wherein m and n are each independently a natural number of 1 to 6).

18. A method of operating an all-solid state battery comprising a composite negative electrode comprising a negative electrode current collector, and unit cells formed on the negative electrode current collector, wherein one unit cell and another unit cell adjacent thereto are spaced apart from each other with a gap therebetween, and the unit cells include an active material comprising a carbon material and a solid electrolyte, the carbon material is intertwined to form a three-dimensional network structure, and the solid electrolyte is loaded in a portion of the network structure; a positive electrode comprising a lithium oxide; and a solid electrode layer comprising an oxide-based solid electrolyte or a sulfide-based solid electrolyte disposed between the composite negative electrode and the positive electrode, the method comprising;
charging the battery; and
precipitating lithium in the gap between the unit cells during charging.

19. The method of claim 18, further comprising supplying charge using the battery.

* * * * *